Aug. 22, 1950 M. K. GOLDSTEIN 2,519,366
DIRECTION FINDER
Filed May 21, 1942 6 Sheets-Sheet 5
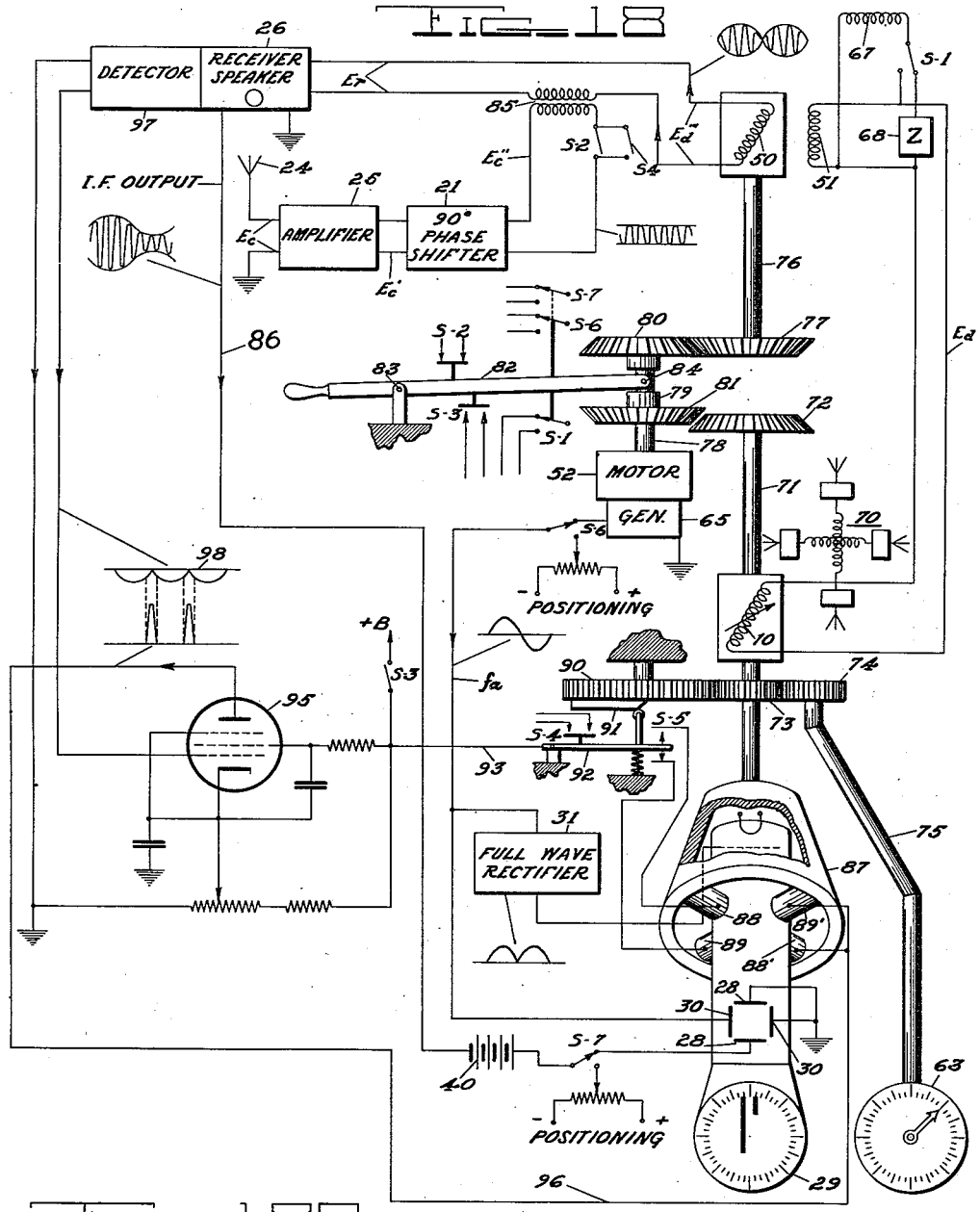
Inventor
Maxwell K. Goldstein
By
[signature]
Attorney

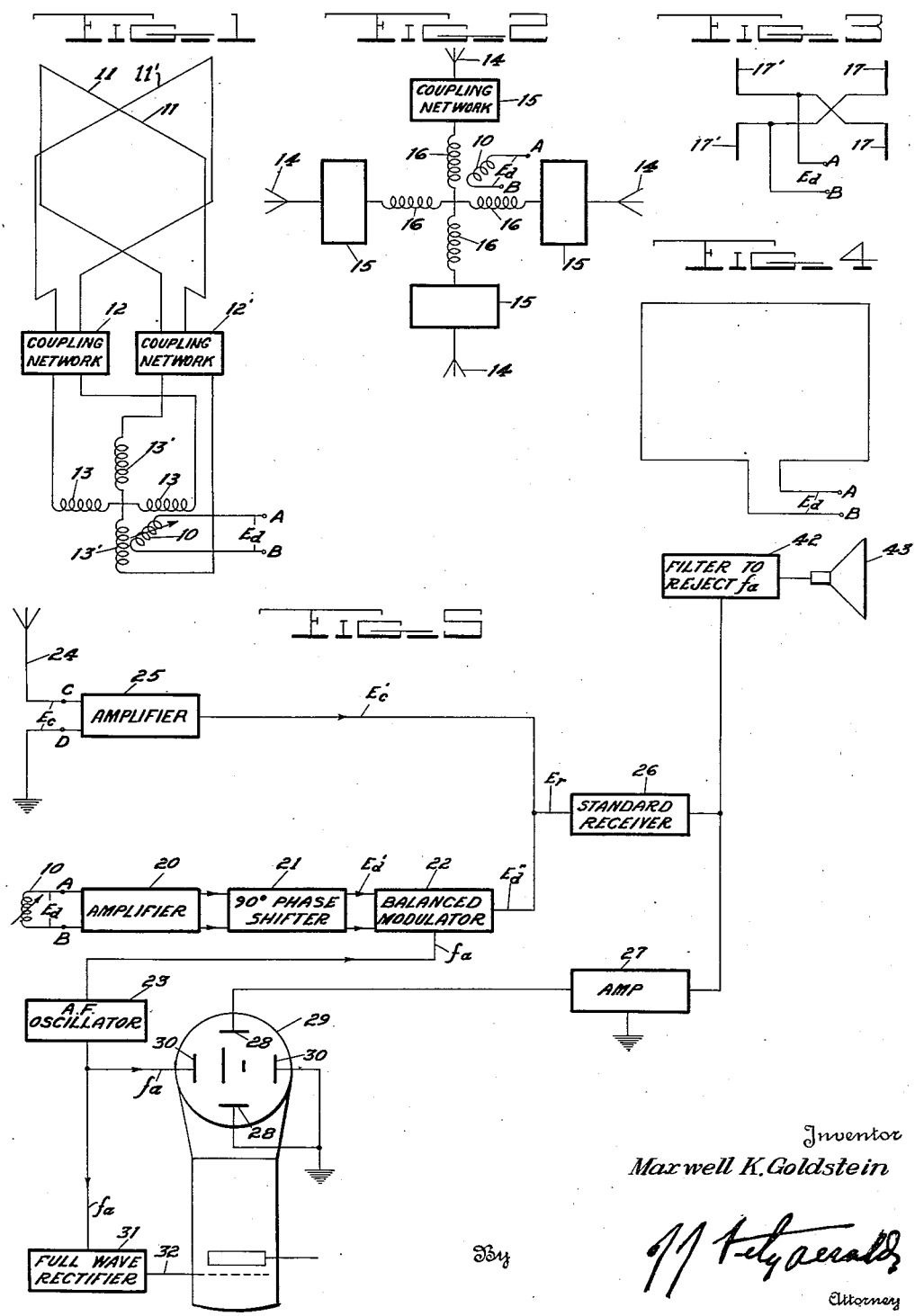

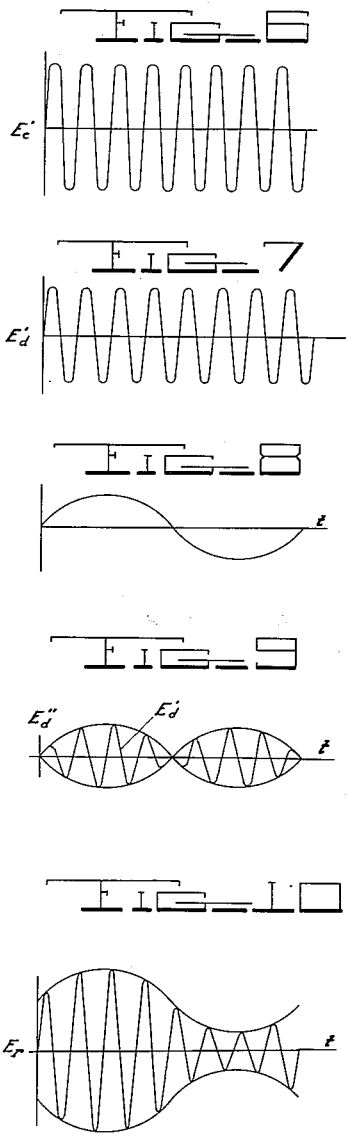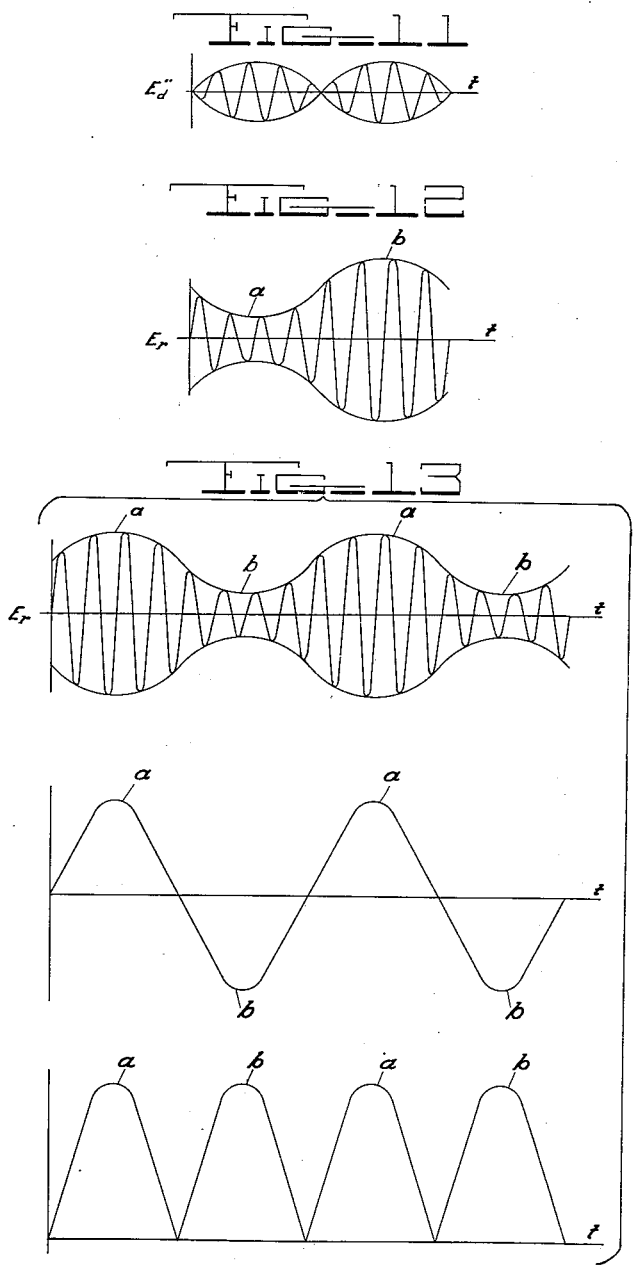

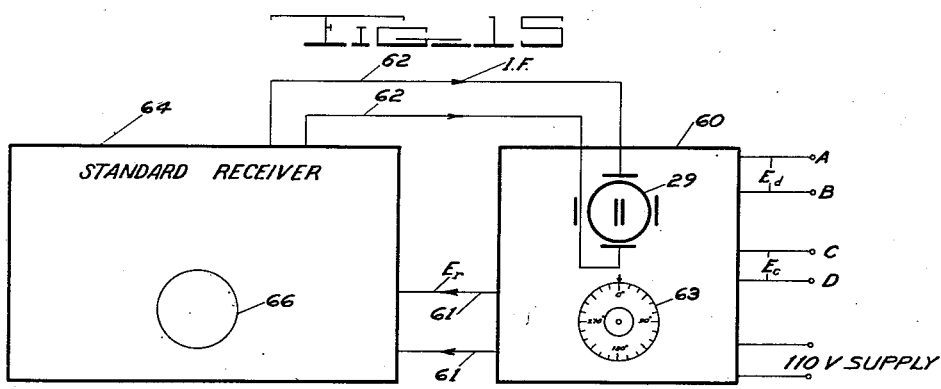

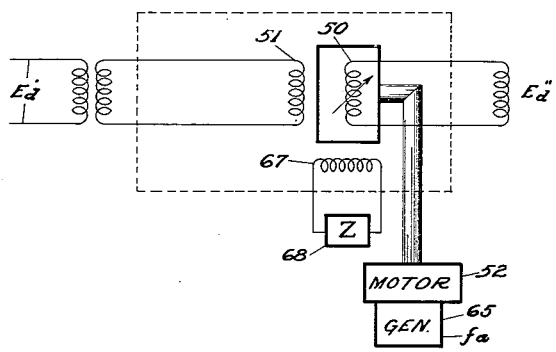
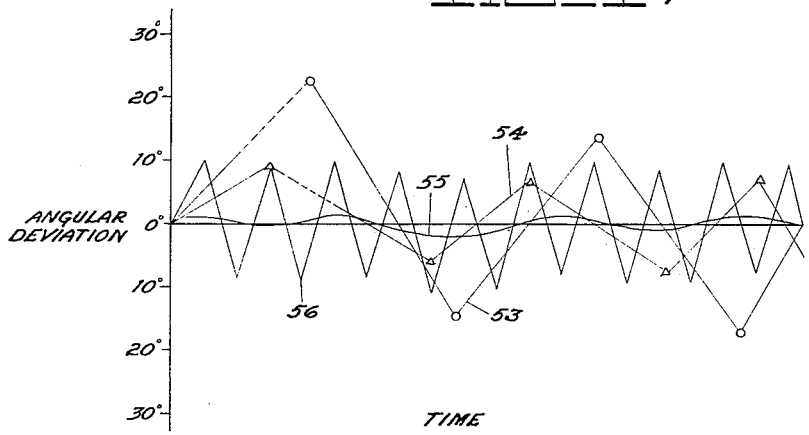

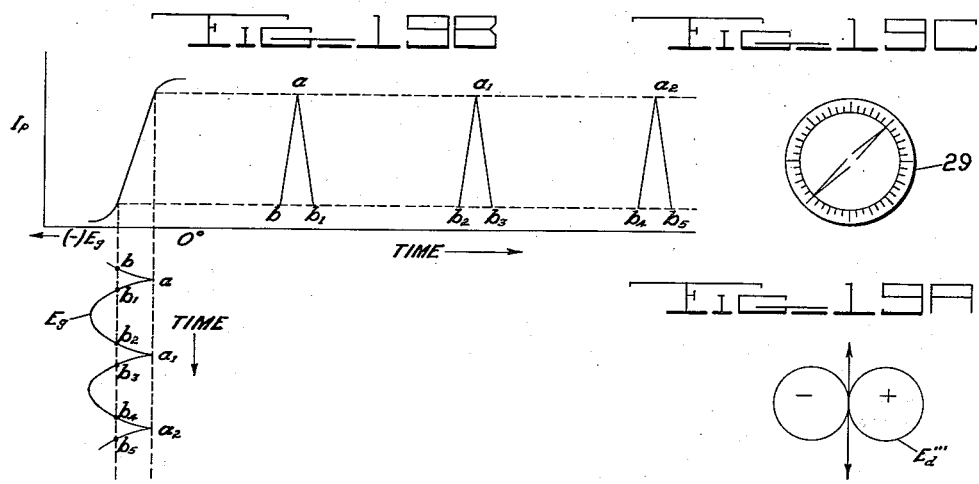
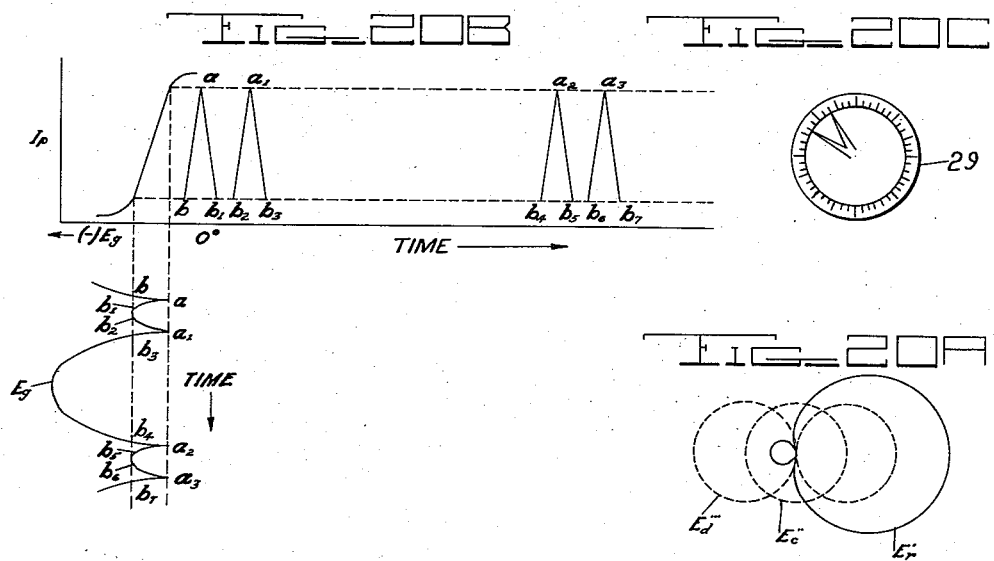

Patented Aug. 22, 1950

2,519,366

UNITED STATES PATENT OFFICE 2,519,366

DIRECTION FINDER

Maxwell K. Goldstein, Washington, D. C.

Application May 21, 1942, Serial No. 443,899

24 Claims. (Cl. 343—121)

(Granted under the act of March 3, 1883, as amended April 30, 1928; 370 O. G. 757)

This invention relates to a direction finder of the type employing a directional antenna system together with a non-directional antenna.

Existing direction finders are subject to several defects, notable among which are the necessity for maintaining accurate balance between collectors; adverse effects upon their resolving power resulting from static; some types of polarization and re-radiation, and inaccuracies due to the effects of program modulations present in the arriving signal.

Among the principal objects of this invention are the following:

To provide a direction finder system that is very rapid in operation.

To provide a direction finder system having continuous sense and capable of continuous message reception.

To provide a direction finder system, the accuracy of which will be unaffected by program modulations and static on the arriving signal.

To provide a direction finder system of high resolving power.

To provide a direction finder system whose resolving power is unaffected by collector unbalance and polarization changes.

To provide a direction finder system which will give an indication of sense simultaneously with the establishment of the line of bearing of an arriving wave, without manipulation for this purpose.

To provide a direction finder system which can be operated as an attachment to a standard receiver, utilizing the receiver as a part of the system, without affecting the operation of the receiver.

Other objects will become apparent from a consideration of the following description when taken together with the accompanying drawings in which:

Fig. 1 is a schematic sketch of a Bellini-Tosi direction finder having a fixed loop type of antenna;

Fig. 2 is a schematic showing of a fixed Adcock type of direction finder;

Fig. 3 is a schematic showing of a rotatable dipole antenna system;

Fig. 4 is a schematic showing of a rotatable loop antenna system;

Fig. 5 is a block diagrammatic showing of a direction finder system embodying the invention;

Figs. 6 to 12 inclusive are diagrams of wave forms of various voltages employed in carrying out the invention;

Fig. 13 is a group of 3 related voltage wave forms impressed upon the elements of a cathode ray oscillograph in carrying out the invention;

Fig. 14 is a chart showing the mathematical and physical make-up of various wave forms employed in carrying out the invention.

Fig. 15 is a schematic showing of the adaptation of a direction finder embodying the invention to the form of an attachment for use with a standard receiver;

Fig. 16 is a schematic showing of an electromechanical device which may be substituted for the balanced modulator of Fig. 5;

Fig. 17 is a graph illustrating the relative degree of accuracy obtainable with various forms of direction finders including one embodying the invention;

Fig. 18 is a schematic showing of an embodiment of the invention including means for automatically obtaining a continuous rough indication of direction and means available at the will of the operator for replacing this indication by one of greater accuracy;

Fig. 18A depicts the type of indication obtained on the screen of an oscilloscope during normal use of a direction finder of the type shown in Fig. 18;

Fig. 19A illustrates the typical directional pattern obtained by one loop antenna;

Fig. 19B depicts the characteristic curve of the voltage waveform applied to the control grid of amplifier tube 95 of the Fig. 18 system;

Fig. 19C depicts the resulting indication on the screen of an oscilloscope of the output from amplifier tube 95 of the Fig. 18 system;

Fig. 20A depicts the composite indication obtained by the superposition of voltage $E''_c$ upon the goniometer output $E'''_d$;

Fig. 20B depicts the output waveform $E_g$ obtained after passage of the resultant voltage $E'_r$ through detector tube 97 of the Fig. 18 system; and Fig. 20C illustrates the type of indication that is produced by the application of the output of tube 95 to the deflection coils of an oscilloscope, and also shows the type of indication with respect to the direction of the received signal as shown by Fig. 19C if the coils are directionally matched with the goniometer coil.

The invention may be carried out by employing any one of the directional antenna systems illustrated in Figs. 1, 2 and 3, together with a non-directional antenna.

Directional collector systems employing fixed antennas such as the Bellini-Tosi system of Fig. 1 and the fixed Adcock system of Fig. 2 are provided with an arrangement of fixed and rotatable coils called a goniometer which is represented in these figures by the coils marked 10, 13 and 13'. The Bellini-Tosi system employs a pair of fixed loops 11, 11' lying in planes which are at right angles to each other. Each loop is coupled by means of a wide band coupling network 12 or 12' to a pair of fixed series connected coils of the goniometer, those coupled to loop 11 being numbered 13 and those coupled to loop 11' being numbered 13'. These coils are usually formed into a cage, the relative locations and spacings of the coils being maintained as shown in Fig. 1. Inside the cage is located the rotatable coil 10 of the goniometer referred to above.

When an arriving wave cuts the vertical portions of the loops 11, 11' currents are caused to flow through coils 13, 13' having such values as to induce in the coil 10 a voltage having characteristics depending upon the orientation of the coil 10 with respect to the arriving wave. The pattern of voltage response in the rotatable coil 10 is such that when the plane of the coil is at right angles to the direction of the arriving wave its voltage output reduces to zero and no signals will be heard. If now the coil is moved from this alignment a voltage will be induced in it which will vary by the amount of movement and the phase of which will correspond to the direction of movement from the null point. That is to say, if one end of the coil be moved from the null point a voltage will be induced in the coil having a particular phase whereas if that end of the coil be moved in the opposite direction from the null point a voltage having the opposite phase will be induced in the coil.

The same conditions will be found in the case of the goniometer of the fixed Adcock type of direction finder schematically illustrated in Fig. 2. In this case four vertical collectors are employed indicated by the numeral 14. These are coupled by means of wide band coupling networks 15 to an arrangement of coils 16 such as that disclosed in Fig. 1. The output of the rotatable coil 10 in both types of direction finder is the same as though the goniometer rotor were a miniature loop collector exposed to the same radio wave impinging upon the fixed collectors. This output thus constitutes a directional voltage having the familiar cosine or "figure of eight" polar response pattern as compared to the non-directional or constant output pattern of a single vertical collector.

The same type of output results from the use of a rotatable dipole or loop direction finder system such as shown in Figs. 3 and 4. The familiar dipole system employs a pair of spaced dipoles 17 and 17', the axis of each pair extending substantially vertically and the upwardly directed element of each pair being connected to the downwardly directed element of the opposite pair. Leads are shown extending from each cross connection to the connection points A, B. The loop system of Fig. 4 consists of a loop formed of one or more turns and terminating at connection points A, B.

In the direction finder system of the invention, one form of which is schematically illustrated in Fig. 5, the output $E_d$ of one of the directional systems of Figs. 1, 2, 3 and 4 is first amplified in an amplifier 20, then submitted to a 90° phase shift in a phase shifting device 21 and impressed upon a modulator of the balanced or carrier suppression type 22. The modulator 22 is controlled by an audio voltage generated, for example, by an audio oscillator 23 and having the frequency $f_a$. The output $E''_d$ of the balanced modulator is now superimposed upon the output $E'_c$ derived from a non-directional antenna 24, after the latter output has been amplified, for example, by an amplifier 25.

Fig. 6 illustrates the wave form of the voltage $E'_c$ and Fig. 7 illustrates that of $E'_d$. The voltage of the frequency $f_a$ which governs the balanced modulator 22 has a wave form such as that illustrated in Fig. 8. The output $E''_d$ of the balanced modulator 22 is illustrated in Fig. 9. It will be noted that this output has a wave form, the envelope of which has the shape of a series of connected lozenge-shaped loops, each cycle of the wave form consisting of two such loops. Each of these loops contains the voltage $E'_d$ but it will be noted that phase of the voltage $E'_d$ reverses between the first and second loops. Thus the voltage $E'_d$ is in effect superimposed upon the voltage $E'_c$ in a sinusoidal manner. The resultant of this superimposition is a voltage $E_r$ having the form shown in Fig. 10. This wave form results because of the fact that the voltage $E'_d$ in the first loop of the wave shown in Fig. 9 is in phase with $E'_c$ and therefore is added thereto, whereas the voltage $E'_d$ in the second loop of the wave form shown in Fig. 9 has reversed in phase with respect to $E'_c$ and is therefore subtracted from it.

The balanced modulator may be replaced, if desired, by an electro-mechanical arrangement such as that shown in Fig. 16, which accomplishes the same result as is accomplished electronically by the modulator. In this modification the rotatable coil 50 is made to sinusoidally vary its coupling at a frequency $f_a$ with respect to a fixed coil 51 which carries the voltage $E'_d$. This is accomplished by the use of a motor 52 rotating coil 50 at the desired speed. The output $E''_d$ of this device will be the same as that of the balanced modulator. Generator 55 may also be driven by motor 52 to produce a voltage having a frequency $f_a$ for use as will be pointed out later. Coil 67 and impedance 68 are employed as a dummy coupled load in order that rotating coil 50 will maintain a constant impedance.

The wave form shown in Fig. 10 will be obtained when the rotatable coil 10 or the dipole or loop of Figs. 3 and 4 is "Off Course" to one side of the direction of the arriving wave. If the rotatable portions of the directional antenna system being used is "On Course," the output of this system and therefore $E''_d$, the output of balanced modulator 22, will reduce to zero and $E_r$ will consist solely of $E'_c$ unmodulated. If now the rotatable antenna system goes "Off Course" to the opposite side of the direction of the arriving wave, the wave form of voltage $E''_d$ will take the form shown in Fig. 11 in which the voltage $E'_d$ contained in the loops is reversed in phase from Fig. 9. The resultant of the superimposition of voltage $E'_d$ upon $E'_c$ will now be a voltage $E_r$ having a wave form such as shown in Fig. 12, since the voltage $E'_d$ of the first loop of Fig. 11 is now reversed in phase from the voltage $E'_c$ whereas the voltage $E'_d$ in the second loop is in phase with $E'_c$.

Voltage $E_r$ is passed through a standard receiver 26, the radio or intermediate frequency output of which is amplified in an amplifier 27 and impressed upon the vertical deflection plates 28 of a cathode ray oscillograph 29. The output of the A. F. oscillator 23 is impressed upon the horizontal deflection plates 30 of the oscillograph. The output of A. F. oscillator 23 is also passed through full wave rectifier 31, the output of which is impressed upon the control grid 32 of the oscillograph.

Fig. 13 shows the wave forms simultaneous applied to the vertical and horizontal deflection plates and the grid of the oscillograph. The upper wave form, it will be noted, is the same as that shown in Fig. 10. Two complete cycles of each voltage are shown. Each cycle of voltage $E_r$ contains a portion $a$, of maximum amplitude and a portion $b$ of minimum amplitude. The middle wave form of Fig. 13 is that of the voltage constituting the output of audio oscillator 23 which is applied to the horizontal deflection plates of the oscillograph. It will be noted that a voltage peak of this wave form occurs simultaneously with the occurrence of the points $a$ and $b$ of voltage $E_r$.

The effect of impressing these voltages simultaneously on the deflection plates is to produce an indication having the shape of a trapezoid on the screen of the oscillograph. If the directional antenna system or its equivalent goniometer rotor coil is "On Course," the shape of the trapezoid will be that of a rectangle since the voltage $E_d$ will reduce to zero and the output $E''_d$ of balanced modulator 22 will likewise be zero. If the directional antenna system is "Of Course" to the left, the wave form of the voltage $E_r$ impressed upon the vertical deflection plates will have a particular phase such, for example, as that shown in Fig. 13. If, however, the directional antenna system is "Off Course" to the right of the direction of the arriving wave, the wave form of the voltage $E_r$ will have its phase reversed and the form of the wave will be that shown in Fig. 12. As the form of the voltage $E_r$ changes phase the shape of the trapezoid will likewise change. With the antenna system "On Course," the trapezoid will become a rectangle. With the wave form such as shown in Fig. 12, the left-hand side of the trapezoid will be shorter than its right hand side. With a wave form of the type shown in Fig. 13, the shape of the trapezoid will be reversed, its long side now being on the left.

The trapezoid pattern indicated on the oscillograph screen can be modified for the purpose of obtaining a more readable indication by eliminating substantially all of the trapezoid except its lateral edges. This is accomplished by the application of the rectified audio voltage output of oscillator 23 to the control grid of the oscillograph in the manner shown in the lower portion of Fig. 13. A negative bias is applied to the control grid, of such a value that only the tops of the rectified wave form are effective in rendering the tube conductive. Thus the electron stream is interrupted except at those times corresponding to the points $a$, $b$ of the respective wave forms of Fig. 13. The resulting indication will consist of two spaced vertical lines, the relative length of which will be an indication of the magnitude of the discrepancy between the orientation of the rotatable portion of the directional antenna system and the direction of the arriving wave. In Fig. 14 is illustrated the mathematical composition and physical appearance of the forms taken by voltage $E_r$ for various conditions of orientation of the direction finder with respect to the arriving wave. The right hand column depicts the shape or form of indication corresponding to each wave form. The lines forming the indication can be brought closer together by reducing the deflecting voltage on the horizontal plates of the oscillograph. It has been found that elimination of the central portion of the trapezoidal indication greatly increases the ease and accuracy with which it may be evaluated by an operator. If this is not done, fluctuations in amplitude in the central part of the indication tend to obscure the relative lengths of its sides and to divert the operator's attention from these portions of the indication.

The output of the standard receiver 26 can simultaneously supply continuous message reception as illustrated in Fig. 5. Here the A. F. output of the receiver 26 is shown impressed upon a system comprising a filter 42 tuned to reject voltage having the frequency $f_a$, and a speaker 43.

The above described direction finding system embodies many advantages over existing types of direction finders. Program or keyed modulations of the arriving wave, static and other noises do not affect the resolution or accuracy of the "On Course" indication because of their lack of synchronization with the horizontal sweep frequency $f_a$. The bearing indications possess continuous sense; the trapezoidal indication faces one way for a bearing having one sense and is reversed for a bearing having the opposite sense. Furthermore, in view of the presence of non-directional voltage $E_c$, continuous message reception can be obtained and automatic volume control can be employed. Moreover, directional collector unbalance and other quadrature effects do not affect the accuracy or resolving power of the direction finder, since their output phase from balanced modulator 22 will be in right angle phase relation to $E_c$ and therefore cannot alter the difference in lengths between the lateral edges of the trapezoid. Thus no balancer device is necessary for the purpose of sharpening the null or "On Course" bearing indication obscured as a result of collector unbalance or antenna effect, and any other quadrature effect such as is produced by most re-radiation and abnormal polarization fields. This is a decided advantage in shipboard installations since quadrature effects are always prevalent in such locations and have heretofore constituted a considerable obstacle to the effective use of direction finders on shipboard. This was particularly true when the operator must employ cut and try methods of arriving at an "On Course" indication, since the correction for quadrature effect varies in an unpredictable manner. Thus the operator must also find the proper correction for this effect by cut and try methods.

Due to the continuous sense feature a direction finder system embodying the invention is capable of satisfactory operation with directional collector systems exhibiting considerable susceptibility to polarization error. This is possible because of the general fluctuating nature of the polarization error and because the directional collector or the equivalent goniometer rotor coil can be rapidly moved to a position where equal positive and negative excursions of the trapezoidal pattern edges are obtained. Thus the operator knows in which direction the apparent bearing has shifted and need only move the rotor coil when the average of the polarization error shifts. Consequently the operator may continually maintain with very little effort the orientation of the rotor coil so as to balance the departures of the trapezoidal pattern edges to either side of the "On Course" position. Since the sense and nature of the indication is continually apparent this requires very little effort and time and results in a performance, such as is indicated by line 55 of Fig. 17. This line is a locus of readings obtainable by an operator with a direction finder embodying the invention. Line 56 shows the excursion of the instantaneous indications on the face of the oscillograph due to polarization error. It will be noted that although these deviations may be considerable, yet the operator need not and does not follow the excursions but merely maintains his rotor coil so positioned that the left and right swings of the indication past the "On Course" position is balanced. In addition to the ease and rapidity with which an average "On Course" position can be maintained, the interialess and synchronization sweep action of the cathode ray method of indication permits freedom from program and keyed modulations. This type of performance is in marked contrast to that obtainable by existing direction finders in the use of which it was first necessary to bring the orientation of the directional system to an instantaneous "On Course" position and then cut in the non-directional antenna in order to obtain an indication of sense. This is a tedious and time-consuming procedure, since the operator has no means of contantly informing himself as to which way to turn the collector system to arrive at the "On Course" position. Then, when he has finally, by trial and error, obtained such an indication, he must consume further time in obtaining the indication of sense, by which time a shift in polarization error may have rendered his previous instantaneous reading incorrect, leaving him without means of instantly knowing in which direction to move the directional system to again arrive at an "On Course" indication. Line 53 of Fig. 17 indicates the rather wide deviations of the readings obtainable with a loop type antenna, which type is subject to polarization errors to a marked degree. The small circles along this line indicate typical loop type readings taken by an observer. The line 54 of Fig. 17 indicates the deviations of the readings obtainable with a rotatable dipole or Adcock type of direction finder. The small triangles along this line indicate typical Adcock readings taken by an observer. It will be noted that while the deviations at which the readings are taken with the rotatable dipole system are much less pronounced than those taken with the loop type antenna, nevertheless, the performance obtainable by the use of this system is much poorer than that obtainable by a direction finder incorporating the invention.

One of the advantages inherent in the invention is its ability to be incorporated into a unit which may be connected to a standard receiver without necessitating modification of the latter and which can be used as an attachment thereto. Such an arrangement is illustrated in Fig. 15, in which the direction finder equipment is indicated by the box 60 from which the voltage Er is supplied through leads 61 to standard receiver 64 having a speaker 66 and from which the intermediate frequency voltage to operate the oscillograph shown schematically at 29, is obtained through leads 62. A conventional manual means for moving the coil of a goniometer or a rotatable antenna system is indicated at 63.

An arrangement further enhancing the ease and efficiency of direction finder operation is disclosed in Fig. 18. Means are provided, in this embodiment, for shifting at will from the highly accurate trapezoidal indication of the embodiments disclosed above, the attainment of which involves manual rotation of the goniometer coil or movable antenna, to a somewhat rougher indication, including sense, attained by an automatic and constant rotation of the goniometer coil or movable antenna system. In actual operation the means producing the rough indication would be in normal use for picking up and roughly locating the direction of a signal, the operator shifting from it to the trapezoidal form of indication to secure a more accurate indication.

Referring now to Fig. 18, there is shown at 70 a schematic representation of a fixed Adcock type of antenna and goniometer system such as shown in Fig. 2, with the fixed coils thereof coupled to the rotatable coil 10 which is mounted for rotation by a shaft 71. This shaft terminates in a bevel gear 72 and also has fixed thereon a gear 73 meshing with a gear 74 driven through a flexible shaft 75 by the manual goniometer rotating means 63 such as shown in Fig. 15.

The voltage $E_d$ from the goniometer coil is converted into the voltage $E'''_d$ by the type of electromechanical means illustrated in Fig. 16 consisting of a fixed coil 51 with which is coupled a rotatable coil 50 mounted for rotation upon shaft 76 carrying bevel gear 77. A motor 52 operating at a controlled constant speed equal in R. P. S. to the frequency $f_a$ drives through a splined shaft 78 a sleeve 79 slidably but non-rotatably mounted thereon and carrying a pair of bevelled gears 80 and 81. A manual gear shifting and switch operating means is shown consisting of the lever 82 pivoted at 83 and terminating in a forked end 84 pivotally connected to sleeve 79. Operation of the lever 82 for the purpose of shifting gears opens and closes a plurality of switches as will be later described.

With the lever 82 in the position shown the rotation of the coil 50 will produce the voltage $E'''_d$ as indicated. This is not, strictly speaking, the same voltage indicated as $E''_d$ in Fig. 5, since its phase has not been shifted. In this embodiment, the phase shift is applied to the voltage $E'_c$, it being immaterial as far as results are concerned whether $E'_c$ or $E'_d$ is shifted. $E_c$ is derived as before from non-directional antenna 24, is amplified in amplifier 25, passed through phase shifter 21 and combined with $E'''_d$ in transformer 85. The resultant $E'_r$ is fed into receiver 26, the I. F. output of which is applied, through lead 86 to the vertical deflection plates 28 of the oscilloscope 29.

The motor 52 drives a generator 65 which produces a voltage having the frequency $f_a$ for application to the horizontal deflection plates 30 of the oscilloscope. The output of the generator is also fed to a full wave rectifier 31 for control of the grid of the oscilloscope as in Figure 5. A plurality of switches provided in various parts of the portion of the embodiment described above are closed by the lever 82 when positioned as shown. The switch $S_1$ connects coil 67 to dummy load 68 so that rotating coil 50 may have a constant impedance and $S_2$ completes the circuit which supplies the voltage $E''_c$. The switch $S_6$ completes the circuit from generator 65 to the horizontal deflection plates of the oscilloscope, and the switch $S_7$ completes the circuit between receiver 26 and the vertical plate of the oscilloscope. A biasing means such as battery 40 may be included to shift the indication half off the oscillograph screen. Then by increasing the length of the indicating lines the effectiveness of the screen may be raised to that of one of twice its diameter. It has been found that it is easier for an operator to follow the deviations of such an indication than those of the complete trapezoidal edges since the resolution is greatly increased and attention may be focused on only two relatively moving portions of the indication.

Thus, with the lever 82 in the position shown, this embodiment of the invention operates in a manner similar to those previously described to produce an accurate trapezoidal indication of direction.

If now, the lever 82 is positioned to unmesh gears 80 and 77 and to mesh gears 81 and 72, the motor 52 will cease to rotate coil 50 and will commence to rotate the goniometer coil 10. The dummy termination connecting to coil 67 lying at right angles to coil 51 and coupled thereto has its circuit now connected in parallel to coil 51 by the closing of switch $S_1$. The circuit supplying $E''_c$ is opened by the opening of switch $S_2$. The opening of switches $S_6$ and $S_7$ now permits spot positioning by applying suitable d. c. potentials to the electrostatic deflection plates of the oscilloscope. The paralleling of coil 67 to coil 51 insures that the magnitude of the output of the goniometer coil will not be adversely affected by the position in which coil 50 is left by the unmeshing of gears 80 and 77.

The shaft 71 which rotates the goniometer coil 10 has mounted thereon the gear wheel 73 as indicated above and also a yoke 87 carrying four coils 88, 88', 89 and 89' equally spaced about the periphery of the oscilloscope 29. These coils act as magnetic deflection means for the electron beam of the oscilloscope.

The portion of the apparatus brought into operation by movement of the lever 82 to its lower position constitutes means by which the coils 88, 88', 89 and 89' are caused to rotate as a unit about the periphery of the oscilloscope in synchronism with the rotation of the goniometer coil. It also constitutes means by which the coils are supplied with voltages related to the voltages induced in the goniometer during its rotation and thus produce on the face of the oscillograph an indication of the direction of a received signal. In order to achieve sense the pairs of opposite coils 88, 88' and 89, 89' are alternatively energized, at a rate higher than that necessary for persistence of vision, with different types of voltage responses to direction finder signal reception. They thus produce different types of indication which when the oscilloscope is viewed appear as one continuous indication having sense.

These results are achieved by applying the rectified voltage response of the directional antenna system to a voltage inverter and amplifier and applying the amplified pulses corresponding to the null points of the antenna response curve to one pair of coils for a predetermined period of time, for example two goniometer revolutions. Then for an equal period of time the sum of the voltage response of the directional and non-directional antennas is applied to the same voltage inverting and amplifying means, the output being applied to the remaining pair of coils.

Meshing with gear 73 is a gear 90 having formed on one face a cam surface 91 extending around an arc of 180°. This surface operates a double throw spring loaded switch arm 92 to which is connected one output lead 93 from amplifier 95, the other output lead 96 of which is connected to coils 88' and 89'. Switch arm 92 carries the movable contacts of double throw switch $S_5$ and single throw switch $S_4$ which latter switch, when closed, completes the circuit coupling the non-directional antenna voltage to the direction antenna voltage. The double throw switch $S_5$ connects lead 93 to either coil 88 or coil 89. With the switch arm 92 in the position shown, the switch $S_4$ is open and the output of tube 95 is connected to coils 89, 89'. The goniometer output is impressed upon receiver 26, the output of which is passed through detector 97 which inverts the wave form to the form shown at 98. This voltage is applied to the control grid of tube 95 the characteristic curve of which is shown in Fig. 19B. As shown there, tube 95 is biased to operate in such a manner that only the minimums of the grid voltage will render the tube conducting. The output of the tube consists of a series of single pulses each occurring at the time the goniometer is passing through a null point. The resulting indication on the screen of the oscilloscope is shown at Fig. 19C. The axis of the indication lies along the direction of signal reception but is without sense.

When the switch arm 92 rides down off the cam face the switch $S_4$ closes and simultaneously the output of tube 95 is impressed upon coils 88, 88'. Closing of the switch $S_4$ causes the voltage $E''_c$ to be superimposed upon the goniometer output $E'''_d$ in the manner shown in Fig. 20A. The amplitudes of these components are selected to give a resultant voltage $E'_r$ having the form of a modified cardioid as shown in Fig. 20A, with two null points spaced thirty or forty degrees apart. The bisector of this angle will lie in a direction at right angles to the direction of signal reception and the response can be used to indicate sense. The resultant $E'_r$ is passed through receiver 26, and detector 97, the output of which is shown at $E_g$ in Fig. 20B. As shown in that figure the application of this voltage to the grid of tube 97 produces one pair of spaced pulses for every goniometer rotation. Fig. 20C shows the type of indication that is produced by the application of the output of tube 95 to the deflection coils of an oscilloscope and shows the orientation of the indication with respect to the direction of the received signal as shown by Fig. 19C if the coils are directionally matched with the goniometer coil. However, by applying the output to the coils 88, 88' which are maintained at right angles to the direction of the goniometer coil, the indication is displaced 90° and when the apparatus of the embodiment of Fig. 18 is in operation the visual indication on the screen of oscilloscope 29 consists of a composite of the two indications of Figs. 19C and 20C and has the appearance shown in Fig. 18A, which is that of an arrow head with the point extending in the direction of the source of the received signal.

An operator using a direction finder of the type shown in Fig. 18 would normally maintain the lever 82 set to obtain the type of indication shown in Fig. 18A and when desiring a more precise indication would shift to the trapezoidal indication.

Ease of operation of this embodiment will be favored by keeping the manual goniometer rotating means 63 close to the face of the oscilloscope 29 and preferably below it. If gearing is not desired the rotating means 63 may be connected by a flexible shaft to the opposite end of shaft 71. The cam operated means 92 may be replaced by a switch operated directly from shaft 71. The gear wheels 77, 80, 81 and 72 may, if desired, be replaced by friction disks. Electrical relays may be employed to accomplish the equivalent of manual gear shifting. These are but examples of the many changes which may be made within the scope of the invention as defined by the appended claims.

The invention described herein may be manufactured and used by or for the Government of the United States of America for governmental purposes without the payment of any royalties thereon or therefor.

I claim:

1. A direction finder, comprising a fixed directional collector system, a goniometer cooperating therewith to produce a voltage varying in accordance with its orientation with respect to an arriving wave, a non-directional antenna, means synchronizing the phase of the output of said goniometer with that of the output of said antenna, means for modulating the output of said goniometer at a low frequency, means for superimposing the modulated output of said goniometer upon the output of said antenna, a cathode ray oscillograph having two pairs of opposed deflection plates, means impressing the resultant of said superimposition upon one of said pairs of plates, means impressing an alternating voltage having said low frequency upon the other of said pairs of plates, and means cutting off the flow of the electron beam of said oscillograph, except at the positive and negative peaks of the voltage applied to said other pair of plates.

2. A direction finder, comprising a fixed directional collector system, a goniometer cooperating therewith to produce a voltage varying in accordance with its orientation with respect to an arriving wave, a non-directional antenna, means synchronizing the phase of the output of said goniometer with that of the output of said antenna, means for modulating the output of said goniometer at a low frequency, means for superimposing the output of said goniometer upon the modulated output of said antenna, a cathode ray oscillograph having two pairs of opposed deflection plates, means impressing the resultant of said superimposition upon one of said pairs of plates, and means impressing an alternating voltage having said low frequency upon the other of said pairs of plates.

3. A direction finder, comprising a fixed directional collector system, a goniometer cooperating therewith to produce a voltage varying in accordance with its orientation with respect to an arriving wave, a non-directional antenna, means synchronizing the phase of the output of said goniometer with that of the output of said non-directional antenna, means for modulating the output of the goniometer at a low frequency, means for superimposing the modulated output of said goniometer upon the output of said non-directional antenna, and means indicating the relative magnitudes of the points of maximum and minimum amplitude of the resultant of said superimposition together with its phase, as an indication of the orientation of said goniometer relative to an arriving wave.

4. A direction finder, comprising a directional antenna system, a non-directional antenna system, means synchronizing the phase of the outputs thereof, means for modulating the output of said directional antenna system at a low frequency, means for superimposing the modulated output of the directional antenna system upon the output of the non-directional antenna system, and means indicating the relative magnitudes of the points of maximum and minimum amplitude of the resultant of said superimposition together with its phase, as an indication of the orientation of said directional antenna system relative to an arriving wave.

5. A direction finder, comprising a directional antenna system, a non-directional antenna system, means synchronizing the phase of the outputs thereof, means for modulating the output of said directional antenna system at a low frequency, means for superimposing the modulated output of the directional antenna system upon the output of the non-directional antenna system, a cathode ray oscillograph having two pairs of opposed deflection plates, means impressing the resultant of said superimposition upon one of said pairs of plates, means impressing an alternating voltage having said low frequency upon the other of said pairs of plates, and means cutting off the flow of the electron beam of said oscillograph except at the positive and negative peaks of the voltage applied to said other pair of plates.

6. A direction finder, comprising a directional antenna system, a non-directional antenna system, means synchronizing the phase of the outputs thereof, means for modulating the output of said directional antenna system at a low frequency, means for superimposing the modulated output of the directional antenna system upon the output of the non-directional antenna system, a cathode ray oscillograph having two pairs of opposed deflection plates, means impressing the resultant of said superimposition upon one of said pairs of plates, and means impressing an alternating voltage having said low frequency upon the other of said pairs of plates.

7. A direction finder, comprising a directional antenna system, a non-directional antenna system, means synchronizing the phase of the outputs thereof, a balanced modulator, means impressing the output of one of said antenna systems upon said balanced modulator, means superimposing the output of said balanced modulator upon the output of the other of said antenna systems, and means indicating the relative magnitudes of the points of maximum and minimum amplitude of the resultant of said superimposition, together with its phase, as an indication of the orientation of said directional antenna system relative to an arriving wave.

8. A direction finder, comprising a directional antenna system, a non-directional antenna system, means synchronizing the phase of the outputs thereof, a balanced modulator, means impressing the output of one of said antenna systems upon said balanced modulator, means applying a low frequency voltage to control the output of said modulator, means superimposing the output of said balanced modulator upon the output of the other of said antenna systems, a cathode ray oscillograph having two pairs of opposed deflection plates, means impressing the resultant of said superimposition upon one of said pairs of plates, means impressing an alternating voltage having said low frequency upon the other of said pairs of plates, and means cutting off the flow of the electron beam of said oscillograph except at the positive and negative peaks of the voltage applied to said other pair of plates.

9. A direction finder, comprising a directional antenna system, a non-directional antenna system, means synchronizing the phase of the outputs thereof, a balanced modulator, means impressing the output of one of said antenna systems upon said balanced modulator, a source of audio frequency voltage, means applying said voltage to control the output of said balanced modulator, means superimposing the output of said balanced modulator upon the output of the other of said antenna systems, a cathode ray oscillograph having two pairs of opposed deflection plates, means impressing the output of said superimposition upon one of said pairs of plates, means simultaneously impressing a voltage from said source upon the remaining pair of said pairs of plates, and means cutting off the flow of the electron beam of said oscillograph except at the positive and negative peaks of the voltage applied to said other pair of plates.

10. A direction finder, comprising a directional antenna system, a non-directional antenna system, means synchronizing the phase of the outputs thereof, a balanced modulator, means impressing the output of one of said antenna systems upon said balanced modulator, a source of audio frequency voltage, means applying said voltage to control the output of said balanced modulator, means superimposing the output of said balanced modulator upon the output of the other of said antenna systems, a cathode ray oscillograph having two pairs of opposed deflection plates, means impressing the output of said superimposition upon one of said pairs of plates, means simultaneously impressing a voltage from said source upon the remaining pair of said pairs of plates, a control grid in said oscillograph, means normally biasing said control grid to cut off and means applying a voltage pulse sufficient to raise the voltage of said grid above cut-off at each positive and negative peak of the voltage applied to said other pair of plates.

11. A direction finder, comprising a directional antenna system, a non-directional antenna system, means synchronizing the phase of the outputs thereof, a balanced modulator, means impressing the output of one of said antenna systems upon said balanced modulator, a source of audio frequency voltage, means applying said voltage to control the output of said balanced modulator, means superimposing the output of said balanced modulator upon the output of the other of said antenna systems, a cathode ray oscillograph having two pairs of opposed deflection plates, means impressing the output of said superimposition upon one of said pairs of plates, means simultaneously impressing a voltage from said source upon the remaining pair of said pairs of plates, a grid in said oscillograph, means normally biasing said grid to cut off, a full wave rectifier, means impressing a voltage from said source upon said full wave rectifier and means impressing the output of said full wave rectifier on said grid whereby the voltage of said grid is raised above the cut-off at each positive and negative peak of said voltage applied to the other of said plates.

12. A direction finder, comprising, in combination a standard receiver, a directional antenna system, a non-directional antenna system, means synchronizing the phase of the outputs of said antenna systems, means for modulating the output of said directional antenna system at a low frequency, means for superimposing the modulated output of the directional antenna system upon the output of the non-directional antenna system, means supplying the voltage resulting from said superimposition to said receiver as a signal, a cathode ray oscillograph, means applying the radio frequency output of said receiver to the vertical beam deflecting means of said oscillograph, means applying a voltage of said low frequency to the horizontal beam deflecting means of said oscillograph, whereby continuous message reception may be had from said receiver concurrently with a continuous indication on the screen of said oscillograph of the direction and sense of the radio wave carrying said message.

13. A direction finder, comprising a fixed directional collector system, a goniometer cooperating therewith to produce a voltage varying in accordance with its orientation with respect to an arriving wave, a non-directional antenna, means synchronizing the phase of the output of said goniometer with that of the output of said non-directional antenna, means for modulating the output of said directional antenna system at a low frequency, means for superimposing the modulated output of the directional antenna system upon the output of the non-directional antenna system, a standard receiver, means supplying the voltage resulting from said superimposition to said receiver as a signal, a cathode ray oscillograph, means applying the radio frequency output of said receiver to the vertical beam deflecting means of said oscillograph, and means applying a voltage of said low frequency to the horizontal beam deflecting means of said oscillograph, whereby continuous message reception may be had from said receiver concurrently with the continuous indication on the screen of said oscillograph of the direction and sense of the radio wave carrying said message.

14. A direction finder, comprising, in combination a standard receiver, a directional antenna system, a non-directional antenna system, means synchronizing the phase of the outputs of said antenna systems, means for modulating the output of said directional antenna system at a low frequency, means for superimposing the modulated output of the directional antenna system upon the output of the non-directional antenna system, means supplying the voltage resulting from said superimposition to said receiver as a signal, and means indicating the relative magnitudes of the points of maximum and minimum amplitude of the radio frequency output of said receiver together with its phase as an indication of the orientation of said directional antenna system to an arriving wave, whereby continuous message reception may be had from said receiver concurrently with a continuous indication of the direction and sense of the radio wave carrying said message.

15. A direction finder comprising a directional antenna system, a non-directional antenna system, means synchronizing the phase of the outputs thereof, means for modulating the output of said directional antenna system at a low frequency, means for superimposing the modulated output of the directional antenna system upon the output of the non-directional antenna system, a cathode ray oscillograph having means for deflecting the trace of its electron beam in two directions at right angles to each other, means impressing the resultant of said superimposition upon the means for deflecting said trace in one of said directions and means impressing a voltage having said low frequency upon the means for deflecting said trace in the other of said direction.

16. A direction finder, comprising a non-directional antenna system, a directional antenna system, a rotatable element forming a part of said directional antenna system and cooperating therewith to produce a voltage varying in accordance with its orientation with respect to an arriving wave, driving means to rotate said element at a fixed speed, means deriving from the outputs of said systems while said element is being so rotated a coarse indication of the direction of an arriving wave, manual means for rotating said element, means deriving from the outputs of said systems while said element is manually rotated a fine indication of said direction and means for shifting from one of said indication deriving means to the other.

17. A direction finder, comprising a non-directional antenna system, a directional antenna system, a rotatable element forming a part of said directional antenna system and cooperating therewith to produce a voltage varying in accordance with its orientation with respect to an arriving wave, driving means to rotate said element at a fixed speed, means deriving from the outputs of said systems while said element is being so rotated a coarse indication of the direction of an arriving wave, manual means for rotating said elements, means deriving from the outputs of said systems while said element is manually rotated a fine indication of said direction and means for shifting from one of said indication deriving means to the other.

18. A direction finder, comprising a non-directional antenna system, a directional antenna system, a rotatable element forming a part of said directional antenna system and cooperating therewith to produce a voltage varying in accordance with its orientation with respect to an arriving wave, driving means to rotate said element at a fixed speed, a cathode ray oscillograph, means employing the outputs of said systems to produce on the screen of said oscillograph while said element is being so rotated a coarse indication of the direction of an arriving wave, manual means for rotating said element, means employing said outputs to produce on said screen while said element is manually rotated a fine indication of said direction and means for shifting from one of said indication producing means to the other.

19. A direction finder, comprising a non-directional antenna system, a directional antenna system, means synchronizing the phase of the outputs of said systems, a rotatable element forming a part of said directional antenna system and cooperating therewith to produce a voltage varying in accordance with the orientation of said element with respect to an arriving wave to constitute a "figure of eight" response pattern, manual means for rotating said element, a receiver, variable coupling means coupling the output of said rotatable element to said receiver, a driving means operable at a fixed speed, a cathode ray oscillograph, two pairs of electro-static beam deflection plates for said oscillograph, means for connecting said driving means to drive either said rotating element or said variable coupling means at will at said fixed speed, means operable when said driving means is connected to said variable coupling means to superimpose the output of said non-directional antenna upon the output of said directional antenna between said coupling means and said receiver, means applying the output of said receiver to one pair of said deflection plates, means generating an alternating current voltage having a frequency equal to the speed of rotation of said coupling means and synchronized therewith, means applying said alternating current voltage to the other pair of said deflection plates whereby a rectangular indication will appear on the screen of said oscillograph when a predeterminer orientation of said rotatable element exists with respect to the direction of origin of said arriving wave, said indication becoming trapezoidal in a manner indicative of sense when said orientation changes, a pair of beam deflection means each adapted to deflect an electron beam of said oscillograph in a plane, means supporting said beam deflection means so that said planes are normal to each other, means mounting said supporting means for rotation with said rotating element, said deflection means being so orientated that the trace of one of said planes on the screen of said oscillograph tracks in azimuth the movement of the axis of minimum response of said directional antenna system, means operative to convert a voltage drop such as that indicated by a null point of said voltage response pattern into a pulse, means operable to shift the driving connection from said driving means between said rotating element and said coupling means, means operable when said driving means is connected to drive said rotatable element to alternatively supply to said converting means at regular intervals synchronized with the rotation of said element the output of said directional antenna system and the combined outputs of said directional and non-directional antenna systems, the latter output having such an amplitude relative to the former as to produce a modified cardioid response pattern having two null points separated by an acute angle, and means to alternatively apply the output of said converting means for first one and then the other of said beam deflection means in synchronism with the alternation of the input to said converting means.

20. A direction finder, comprising a non-directional antenna system, a directional antenna system, a rotatable element forming a part of said directional system and cooperating therewith to produce a voltage varying in accordance with its orientation with respect to an arriving wave to constitute a "figure of eight" voltage response pattern, a receiver, variable coupling means between the output of said directional antenna system and said receiver, driving means rotatable at a fixed speed, a cathode ray oscillograph, means deriving from said outputs a fine indication of said direction, means deriving from said outputs a coarse indication of said direction and means for shifting at the will of an operator from one of said indications to another; said fine indication driving means comprising two pair of electrostatic deflection plates in said oscillograph, means connecting said driving means to rotate said variable coupling means at a fixed speed, means to apply the radio frequency output of said receiver to one pair of said deflection plates, means generating a voltage synchronized in frequency with the rotation of said coupling means and means applying said voltage to the other pair of said deflection plates; said coarse indication deriving means comprising a pair of beam deflection means for said oscillograph each operating to deflect the electron beam of said oscillograph in a plane at right angles to the deflection plane of the other, means supporting said deflection means for rotation with said rotatable element, means connecting said driving means to rotate said rotating element at said fixed speed, means to convert a voltage drop such as that represented by a null point on said voltage response pattern into a pulse, means synchronized with the rotation of said element to apply the output of said directional antenna system in alternation with the combined outputs of said directional and non-directional antenna systems to said converting means in a regular sequence synchronized with the rotation of said rotatable element, the relative amplitudes of the outputs of said systems being such as to produce a response pattern having two null points separated by an acute angle and means alternating the application of the output of said converting means between said deflecting means in synchronism with the alternation of the inputs of said converting means; said shifting means comprising means rendering inoperative each of said indicating systems while the other is in operation.

21. A direction finder, comprising a non-directional antenna system, a directional antenna system, a rotatable element forming a part of said directional antenna system and cooperating therewith to produce a voltage varying in accordance with the orientation of said element with respect to an arriving wave to constitute a "figure of eight" response pattern, driving means operable at a fixed speed, a cathode ray oscillograph, variable coupling means for superimposing the outputs of said antenna systems, means to connect said driving means at will to drive either said rotating element or said variable coupling means at said fixed speed, means applying the outputs of said antenna systems to said oscillograph when said driving means is connected to said rotatable element in a manner to produce a coarse indication of the direction of said wave, and means applying the outputs of said antenna systems to said oscillograph when said driving means is connected to said variable coupling means in a manner to produce a fine indication of the direction of said arriving wave.

22. A direction finder, comprising a directional antenna system, a non-directional antenna system, a rotatable element forming a part of said directional antenna system and cooperating therewith to produce a voltage varying in accordance with its orientation with respect to an arriving wave to constitute a "figure of eight" response pattern, a cathode ray oscillograph, a first means for deflecting the electron beam of said oscillograph, an azimuth scale on said oscillograph, means mounting said beam deflecting means for rotation about said oscillograph in synchronism with said element in such a manner that the rotatable deflections produced by said deflecting means track with respect to said scale the movement of the axis of minimum response of said directional antenna system, a second means for deflecting the electron beam of said oscillograph, said means being carried by said mounting means in such a position as to cause deflections in said beam at right angles to those caused by said first deflecting means, means for combining the outputs of said antenna systems to produce a modified cardioid response curve having two null points separated by an acute angle, means converting a voltage drop such as that represented by a null point of said voltage response pattern into a pulse, means rotating said rotatable element at a fixed speed, means alternately applying the output of said directional antenna system and the combined outputs of said antenna systems to said converting means at spaced intervals of time and simultaneously applying the output of said converting means alternatively to said first and second deflecting means respectively, thereby automatically producing on the screen of said oscillograph a composite indication in the shape of an arrowhead pointing in the direction of the origin of said arriving wave as represented by said azimuth scale.

23. A direction finder, comprising a non-directional antenna system, a directional antenna system, a rotatable element forming a part of said directional antenna system and cooperating therewith to produce a voltage varying in accordance with its orientation with respect to an arriving wave, driving means for rotating said element at a fixed speed, a cathode-ray oscillograph, means responsive to the output of said directional antenna while so rotating, to produce on the screen of said oscillograph an indication comprising a pair of radial pulses oppositely directed and lying along a line representing on said screen the directional locus of said arriving wave, means for superimposing the outputs of said systems, means responsive to the resultant of said superimposed outputs to produce on the screen of said oscillograph an indication comprising a pair of radial pulses diverging from the center of said screen and symmetrically located with respect to said line, and means automatically energizing said indication producing means in alternative sequence, at such a rate that a composite visual indication appears on said screen in the shape of an arrowhead pointing in the direction of said wave.

24. A direction finder, comprising a directional antenna system, a non-directional antenna system, means synchronizing the phase of the outputs thereof, means for modulating the output of said directional antenna system at a low frequency, means for superimposing the modulated output of the directional antenna system upon the output of the non-directional antenna system, a cathode ray oscillograph having two pair of opposed deflection plates, means impressing the resultant of said superimposition upon one of said pairs of plates, means impressing an alternating voltage having said low frequency upon the other of said pairs of plates, means cutting off the flow of the electron beam of said oscillograph except at the positive and negative peaks of the voltage applied to said other pair of plates, thereby causing to be formed on the screen of said oscillograph an indication comprising a pair of parallel marks which vary in length as a function of the orientation of said directional antenna system with respect to an arriving wave, and means moving said indication to the edge of said screen until only one end of each of said marks remain visible.

MAXWELL K. GOLDSTEIN.

REFERENCES CITED

The following references are of record in the file of this patent:

UNITED STATES PATENTS

| Number | Name | Date |
|---|---|---|
| 2,143,178 | Wright | Jan. 10, 1939 |
| 2,233,275 | Wolff | Feb. 25, 1941 |
| 2,252,063 | Cockerell | Aug. 12, 1941 |
| 2,263,377 | Busignies et al. | Nov. 18, 1941 |